(12) United States Patent
Sun et al.

(10) Patent No.: US 10,395,624 B2
(45) Date of Patent: Aug. 27, 2019

(54) ADJUSTING AN ANGULAR SAMPLING RATE DURING RENDERING UTILIZING GAZE INFORMATION

(71) Applicant: NVIDIA Corporation, Santa Clara, CA (US)

(72) Inventors: Qi Sun, Centereach, NY (US);
Fu-Chung Huang, Cupertino, CA (US);
Joohwan Kim, Berkeley, CA (US);
David Patrick Luebke, Charlottesville, VA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 15/880,460

(22) Filed: Jan. 25, 2018

(65) Prior Publication Data
US 2019/0156793 A1   May 23, 2019

Related U.S. Application Data

(60) Provisional application No. 62/589,400, filed on Nov. 21, 2017.

(51) Int. Cl.
| | |
|---|---|
| G06T 15/20 | (2011.01) |
| G09G 5/391 | (2006.01) |
| H04N 13/139 | (2018.01) |
| H04N 13/383 | (2018.01) |
| G06T 15/00 | (2011.01) |

(52) U.S. Cl.
CPC .............. *G09G 5/391* (2013.01); *G06T 15/20* (2013.01); *H04N 13/139* (2018.05); *H04N 13/383* (2018.05); *G06T 15/005* (2013.01); *G09G 2340/0407* (2013.01); *G09G 2354/00* (2013.01)

(58) Field of Classification Search
None
See application file for complete search history.

(56) References Cited

U.S. PATENT DOCUMENTS

| | | |
|---|---|---|
| 8,493,390 B2 | 7/2013 | Kalinli |
| 9,589,367 B2 | 3/2017 | Golas et al. |
| 9,600,069 B2 | 3/2017 | Publicover et al. |
| 9,710,881 B2 | 7/2017 | Cerny |
| 9,727,991 B2 | 8/2017 | Guenter et al. |
| 2009/0248036 A1 | 10/2009 | Hoffman et al. |
| 2010/0056274 A1 | 3/2010 | Uusitalo et al. |
| 2014/0247277 A1* | 9/2014 | Guenter .................. G06T 11/40 345/611 |

(Continued)

OTHER PUBLICATIONS

Rajashekar et al., "Foveated analysis of image features at fixations," Vision Research, vol. 47, No. 25, 2007, pp. 3160-3172.

(Continued)

*Primary Examiner* — Andrew G Yang
(74) *Attorney, Agent, or Firm* — Leydig, Voit & Mayer, Ltd.

(57) ABSTRACT

A method, computer readable medium, and system are disclosed for adjusting an angular sampling rate during rendering. The method includes the steps of determining a location of a gaze within a displayed scene, and adjusting, during a rendering of the scene, an angular sampling rate used to render at least a portion of the scene, based on the location of the gaze within the displayed scene.

23 Claims, 10 Drawing Sheets

(56) References Cited

U.S. PATENT DOCUMENTS

| | | | |
|---|---|---|---|
| 2016/0042501 A1* | 2/2016 | Huang | G06T 5/003 345/428 |
| 2016/0267716 A1 | 9/2016 | Patel | |
| 2016/0307372 A1* | 10/2016 | Pitts | H04N 5/2254 |
| 2016/0314562 A1 | 10/2016 | Sakamoto | |
| 2016/0328884 A1 | 11/2016 | Schowengerdt et al. | |
| 2016/0343164 A1 | 11/2016 | Urbach et al. | |
| 2016/0350965 A1 | 12/2016 | Lum et al. | |
| 2017/0011492 A1 | 1/2017 | Thunstrom et al. | |
| 2017/0039960 A1 | 2/2017 | Jepsen | |
| 2017/0045941 A1 | 2/2017 | Tokubo et al. | |
| 2017/0084083 A1 | 3/2017 | Wilson et al. | |
| 2017/0091549 A1 | 3/2017 | Gustafsson et al. | |
| 2017/0178395 A1 | 6/2017 | Pharr | |
| 2017/0200252 A1 | 7/2017 | Nguyen et al. | |
| 2017/0200308 A1 | 7/2017 | Nguyen et al. | |
| 2017/0214907 A1* | 7/2017 | Lapstun | H04N 13/302 |
| 2017/0236252 A1 | 8/2017 | Nguyen et al. | |
| 2017/0236466 A1 | 8/2017 | Spitzer et al. | |
| 2017/0255257 A1 | 9/2017 | Tiana et al. | |
| 2017/0285735 A1 | 10/2017 | Young et al. | |
| 2017/0285736 A1 | 10/2017 | Young et al. | |
| 2017/0287112 A1 | 10/2017 | Stafford et al. | |
| 2017/0287447 A1 | 10/2017 | Barry et al. | |
| 2018/0330652 A1* | 11/2018 | Perreault | G02B 27/0075 |

OTHER PUBLICATIONS

Wang et al., "Embedded Foveation Image Coding," IEEE Transactions on Image Processing, vol. 10, No. 10, Oct. 2001, pp. 1397-1410.

George et al., "Fast and Accurate Algorithm for Eye Localization for Gaze Tracking in Low Resolution Images," IET Computer Vision, vol. 10, No. 7, 2016, pp. 1-12.

Hansen et al., "In the eye of the beholder: A survey of models for eyes and gaze," IEEE transactions on pattern analysis and machine intelligence, vol. 32, No. 3, Feb. 2009, pp. 1-42.

Mita et al. "Detection of the gaze direction of a driver using the time-varying image processing," JSAE Review, vol. 24, No. 3, 2003, pp. 347-353.

Guenter et al., "Foveated 3D graphics," ACM Transactions on Graphics (TOG), vol. 31, No. 6, 2012, pp. 1-10.

Hachisuka et al., "Multidimensional adaptive sampling and reconstruction for ray tracing," ACM Transactions on Graphics (TOG), vol. 27, No. 3, 2008, pp. 1-10.

Halle, M., "Multiple viewpoint rendering for three-dimensional displays," Diss. Massachusetts Institute of Technology, 1997, pp. 1-164.

Heide et al., "Adaptive image synthesis for compressive displays," ACM Transactions on Graphics (TOG), vol. 32, No. 4, 2013, pp. 1-12.

Huang et al., "The light field stereoscope: immersive computer graphics via factored near-eye light field displays with focus cues," ACM Transactions on Graphics (TOG), vol. 34, No. 4, 215, pp. 1-12.

Koskela et al., "Foveated Path Tracing," International Symposium on Visual Computing, Springer, Cham, 2016, pp. 1-10.

Lanman et al., "Near-eye light field displays," ACM Transactions on Graphics (TOG), vol. 32, No. 6, 2013, pp. 1-10.

Maimone et al., "Focus 3D: Compressive accommodation display," ACM Trans. Graph., vol. 32, No. 5, 2013, pp. 153.1-153.13.

Patney et al. "Towards foveated rendering for gaze-tracked virtual reality," ACM Transactions on Graphics (TOG), vol. 35, No. 6, 2016, pp. 1-12.

* cited by examiner

ADJUSTING AN ANGULAR SAMPLING RATE DURING RENDERING UTILIZING GAZE INFORMATION

CLAIM OF PRIORITY

This application claims the benefit of U.S. Provisional Application No. 62/589,400 titled "ADJUSTING AN ANGULAR SAMPLING RATE DURING RENDERING," filed Nov. 21, 2017, the entire contents of which is incorporated herein by reference.

FIELD OF THE INVENTION

The present invention relates to image rendering, and more particularly to reducing an operational cost of light field rendering.

BACKGROUND

Virtual reality and immersive displays have experienced a recent rise in popularity, but these displays are sometimes associated with visual discomfort by users. Light field displays are used to help provide a more comfortable visual experience for a viewer. However, current implementations of light field displays use rendering techniques that are very time and resource intensive.

Thus, there is a need for addressing these issues and/or other issues associated with the prior art.

SUMMARY

A method, computer readable medium, and system are disclosed for adjusting an angular sampling rate during rendering. The method includes the steps of determining a location of a gaze within a displayed scene, and adjusting, during a rendering of the scene, an angular sampling rate used to render at least a portion of the scene, based on the location of the gaze within the displayed scene.

DETAILED DESCRIPTION

Figure 1:
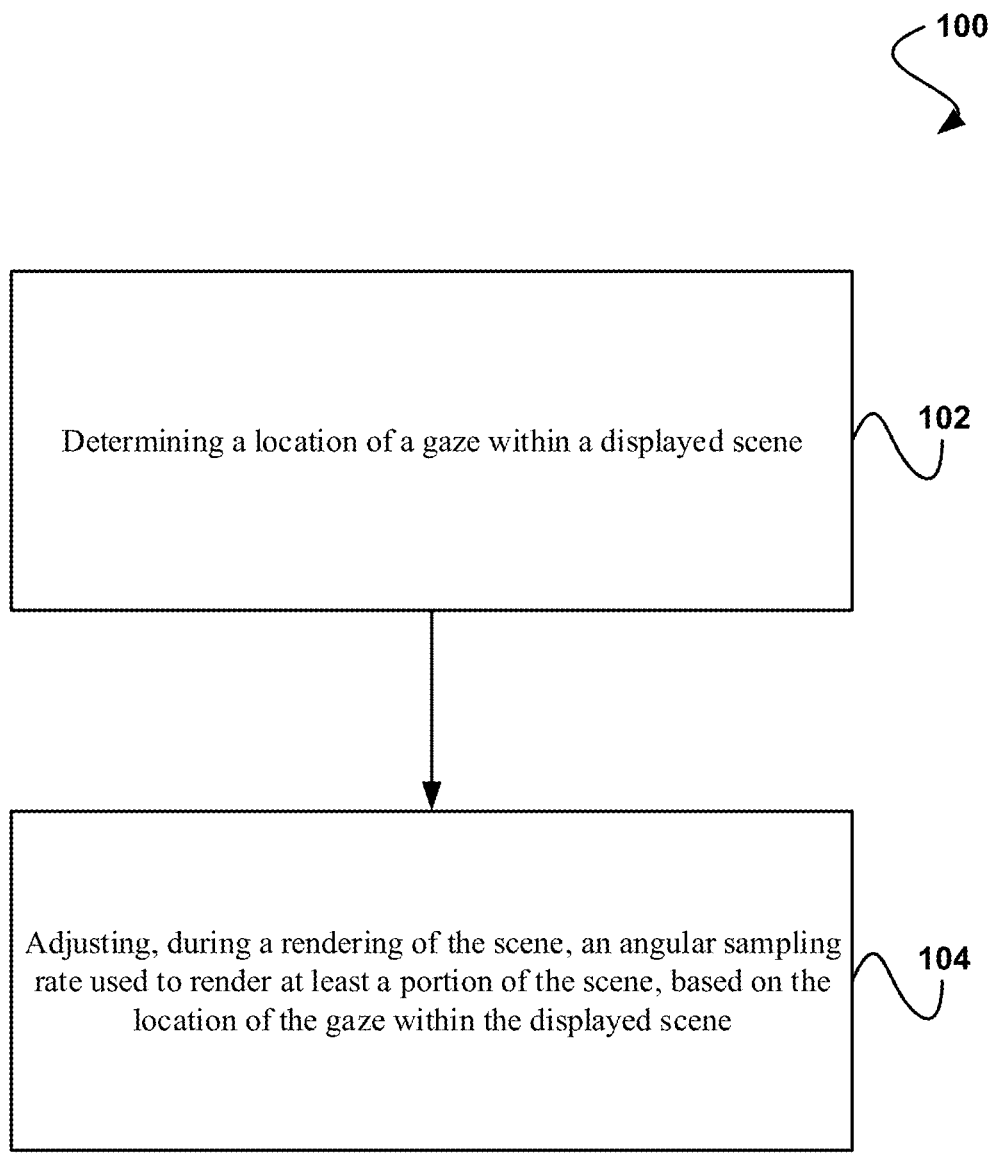
FIG. 1 illustrates a flowchart of a method for adjusting an angular sampling rate during rendering utilizing gaze information, in accordance with one embodiment.

FIG. 1 illustrates a flowchart of a method 100 for adjusting an angular sampling rate during rendering utilizing gaze information, in accordance with one embodiment. As shown in operation 102, a location of a gaze is determined within a displayed scene. In one embodiment, the location of the gaze may include a current gaze point within the scene. In another embodiment, the gaze may include a gaze of a user. For example, the user may include a user of a device display. In yet another embodiment, the location of the gaze may be determined by tracking a movement of one or more eyes of the user.

Additionally, in one embodiment, the scene may include one or more objects displayed to the user within a device display. For example, the device display may include a virtual reality display (e.g., a 4D light field display), a holographic display, an automotive windshield/heads-up display, etc.

Further, as shown in operation 104, an angular sampling rate used to render at least a portion of the scene is adjusted during a rendering of the scene, based on the location of the gaze. In one embodiment, the adjusting may include determining an eccentricity from the current gaze point for a predetermined area within the scene. For example, the predetermined area may include one or more pixels within a display. In another example, the eccentricity may include a distance from the current gaze point to the predetermined area.

Further still, in one embodiment, the adjusting may include adjusting the angular sampling rate for the predetermined area, based on the eccentricity. For example, the angular sampling rate may be increased for the one or more pixels within the predetermined area in response to a decrease in eccentricity. In another example, the angular sampling rate may be decreased for the one or more pixels within the predetermined area in response to an increase in eccentricity.

Also, in one embodiment, the angular sampling rate may indicate a number of views per pixel that are rendered within the predetermined area. For example, angular sampling may include light field view sampling (e.g., light field view sampling used to produce content in a 4D light field display, etc.). In another embodiment, the predetermined area may include a predefined eye box. For example, instead of a single camera/eye location, the eye box may include a predefined grid of a plurality of baseline points (e.g., virtual camera locations, etc.) covering a predetermined portion of an eye of the user (e.g., a pupil, etc.).

In addition, in one embodiment, each rendered view within the predetermined area may represent a scene rendered from the perspective of a baseline point within the eye box. In another embodiment, a lower angular sampling rate may render a smaller number of views within the eye box when compared to a higher angular sampling rate.

Furthermore, in one embodiment, a spatial sampling rate used to render the scene may also be adjusted, based on the eccentricity. For example, the spatial sampling rate may decrease as eccentricity increases. In another embodiment, the spatial sampling rate may include a number of spatial pixels that are sampled (e.g., within a predetermined area, etc.).

Further still, in one embodiment, the adjusting may include comparing, for a location within the scene, a spatial sampling rate of a display to a spatial sampling rate of a retina for that location. For example, the spatial sampling rate of the retina may be calculated using receptive field density of retinal cells. In another example, the spatial sampling rate of the retina may decrease as the eccentricity increases. In yet another example, when the spatial sampling rate of the display is larger than the spatial sampling rate of the retina, the spatial sampling rate may be reduced for the location. In still another example, when the spatial sampling rate of the display is larger than the spatial sampling rate of the retina, the angular sampling rate may be reduced for the location.

Also, in one embodiment, a user's gaze point may be identified within a scene (e.g., by tracking eye movements of the user, using one or more hardware elements and one or more applications). Additionally, during a first rendering pass, a first angular sampling may be implemented for the scene. For example, the first angular sampling may include a single view (e.g., a single baseline point within a predefined eye-box, etc.) that is rendered for all pixels of the entire scene.

Additionally, in one embodiment, during a second rendering pass, a second angular sampling rate may be implemented for a first predetermined portion of the scene. For example, the first predetermined portion of the scene may include a portion of the scene having half of a field of view of the entire scene. In another example, the rate of the second angular sampling may be greater than the rate of the first angular sampling. For instance, the second angular sampling (e.g., the second pass of angular sampling, etc.) may include a plurality of views (e.g., multiple baseline points within the predefined eye-box, etc.) that are rendered for a subset of the pixels within the first predetermined portion of the scene.

Further, in one embodiment, within the scene, the angular sampling rate for a pixel may increase as a pixel distance to the user's gaze point decreases. For example, during a third rendering pass, a third angular sampling rate may be implemented for a second predetermined portion of the scene. In one embodiment, the second predetermined portion of the scene may include a portion of the scene having half of a field of view of the first predetermined portion of the scene. In another embodiment, the second angular sampling rate may be greater than the first angular sampling rate. In yet another embodiment, the second angular sampling rate may include a plurality of views (e.g., multiple baseline points within the predefined eye-box, etc.) that are rendered for a subset of the pixels within the second predetermined portion of the scene.

Further still, in one embodiment, when the gaze point of a user is at the center of the eye-box, during a first rendering pass, the rendering may be projected to the center of the eye-box, and the rendering covers the entire field of view or the scene. During the second rendering pass, a projection of the rendering may be off-centered with respect to the center of the eye-box, and the rendering may cover a subset of the field of view from the first rendering pass. This may be continued during subsequent rendering passes until the off-centered views cover the entire eye-box.

Also, in one embodiment, the scene may be presented using an automotive display. For example, the scene may be presented as part of one or more of an automotive infotainment display, a vehicle instrument cluster, a windshield/heads up display, etc. In another embodiment, the display may include a foveated focus-supporting display, which may reduce an amount of computation necessary for scene generation within the display.

In addition, in one embodiment, a light field representation may be created, utilizing deep learning, neural networks, etc. For example, a depth component of a light field representation may be inferred, utilizing a deep learning approach. In another embodiment, positional view rendering may be avoided, utilizing one or more deep learning techniques.

In this way, foveated light field view sampling may be achieved during light field rendering. More specifically, during rendering, an area around a gaze position within a scene may be rendered with higher spatial-angular detail when compared to an area farther from the gaze position within the scene. This may reduce a computational cost of performing the light field rendering while maintaining the quality of the viewed scene/imagery, which may increase a performance of the light field rendering.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

Figure 2:
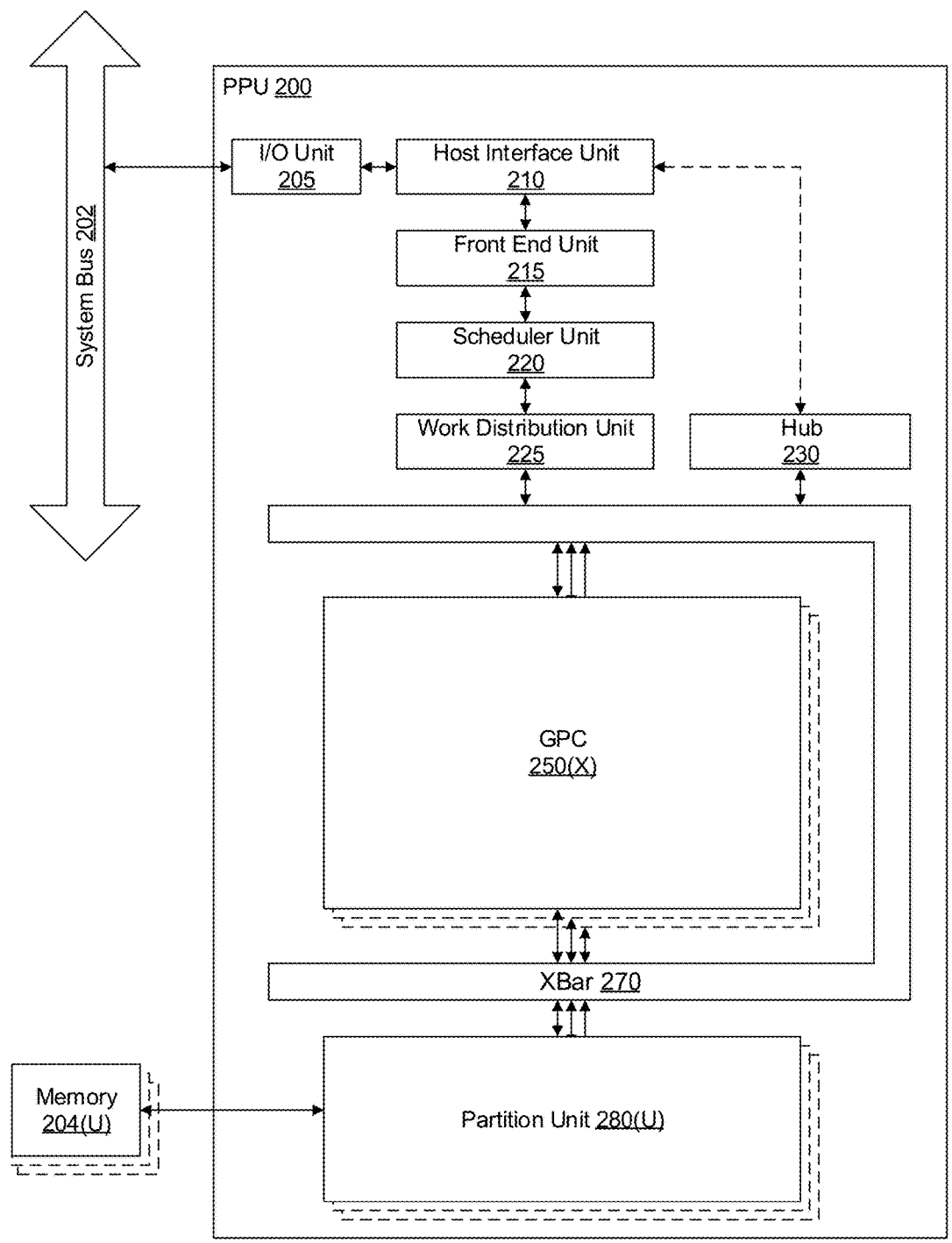
FIG. 2 illustrates a parallel processing unit, in accordance with one embodiment.

FIG. 2 illustrates a parallel processing unit (PPU) 200, in accordance with one embodiment. In one embodiment, the PPU 200 is a multi-threaded processor that is implemented on one or more integrated circuit devices. The PPU 200 is a latency hiding architecture designed to process a large number of threads in parallel. A thread (i.e., a thread of execution) is an instantiation of a set of instructions configured to be executed by the PPU 200. In one embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 2, the PPU 200 includes an Input/Output (I/O) unit 205, a host interface unit 210, a front end unit 215, a scheduler unit 220, a work distribution unit 225, a hub 230, a crossbar (Xbar) 270, one or more general processing clusters (GPCs) 250, and one or more partition units 280. The PPU 200 may be connected to a host processor or other peripheral devices via a system bus 202. The PPU 200 may also be connected to a local memory comprising a number of memory devices 204. In one embodiment, the local memory may comprise a number of dynamic random access memory (DRAM) devices.

The I/O unit 205 is configured to transmit and receive communications (i.e., commands, data, etc.) from a host processor (not shown) over the system bus 202. The I/O unit 205 may communicate with the host processor directly via the system bus 202 or through one or more intermediate devices such as a memory bridge. In one embodiment, the I/O unit 205 implements a Peripheral Component Interconnect Express (PCIe) interface for communications over a PCIe bus. In alternative embodiments, the I/O unit 205 may implement other types of well-known interfaces for communicating with external devices.

The I/O unit 205 is coupled to a host interface unit 210 that decodes packets received via the system bus 202. In one embodiment, the packets represent commands configured to cause the PPU 200 to perform various operations. The host interface unit 210 transmits the decoded commands to various other units of the PPU 200 as the commands may specify. For example, some commands may be transmitted to the front end unit 215. Other commands may be transmitted to the hub 230 or other units of the PPU 200 such as one or more copy engines, a video encoder, a video decoder, a power management unit, etc. (not explicitly shown). In other words, the host interface unit 210 is configured to route communications between and among the various logical units of the PPU 200.

In one embodiment, a program executed by the host processor encodes a command stream in a buffer that provides workloads to the PPU 200 for processing. A workload may comprise a number of instructions and data to be processed by those instructions. The buffer is a region in a memory that is accessible (i.e., read/write) by both the host processor and the PPU 200. For example, the host interface unit 210 may be configured to access the buffer in a system memory connected to the system bus 202 via memory requests transmitted over the system bus 202 by the I/O unit 205. In one embodiment, the host processor writes the command stream to the buffer and then transmits a pointer to the start of the command stream to the PPU 200. The host interface unit 210 provides the front end unit 215 with pointers to one or more command streams. The front end unit 215 manages the one or more streams, reading commands from the streams and forwarding commands to the various units of the PPU 200.

The front end unit 215 is coupled to a scheduler unit 220 that configures the various GPCs 250 to process tasks defined by the one or more streams. The scheduler unit 220 is configured to track state information related to the various tasks managed by the scheduler unit 220. The state may indicate which GPC 250 a task is assigned to, whether the task is active or inactive, a priority level associated with the task, and so forth. The scheduler unit 220 manages the execution of a plurality of tasks on the one or more GPCs 250.

The scheduler unit 220 is coupled to a work distribution unit 225 that is configured to dispatch tasks for execution on the GPCs 250. The work distribution unit 225 may track a number of scheduled tasks received from the scheduler unit 220. In one embodiment, the work distribution unit 225 manages a pending task pool and an active task pool for each of the GPCs 250. The pending task pool may comprise a number of slots (e.g., 32 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

The work distribution unit 225 communicates with the one or more GPCs 250 via XBar 270. The XBar 270 is an interconnect network that couples many of the units of the PPU 200 to other units of the PPU 200. For example, the XBar 270 may be configured to couple the work distribution unit 225 to a particular GPC 250. Although not shown explicitly, one or more other units of the PPU 200 are coupled to the host unit 210. The other units may also be connected to the XBar 270 via a hub 230.

The tasks are managed by the scheduler unit 220 and dispatched to a GPC 250 by the work distribution unit 225. The GPC 250 is configured to process the task and generate results. The results may be consumed by other tasks within the GPC 250, routed to a different GPC 250 via the XBar 270, or stored in the memory 204. The results can be written to the memory 204 via the partition units 280, which implement a memory interface for reading and writing data to/from the memory 204. In one embodiment, the PPU 200 includes a number U of partition units 280 that is equal to the number of separate and distinct memory devices 204 coupled to the PPU 200. A partition unit 280 will be described in more detail below in conjunction with FIG. 3B.

In one embodiment, a host processor executes a driver kernel that implements an application programming interface (API) that enables one or more applications executing on the host processor to schedule operations for execution on the PPU 200. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 3A:
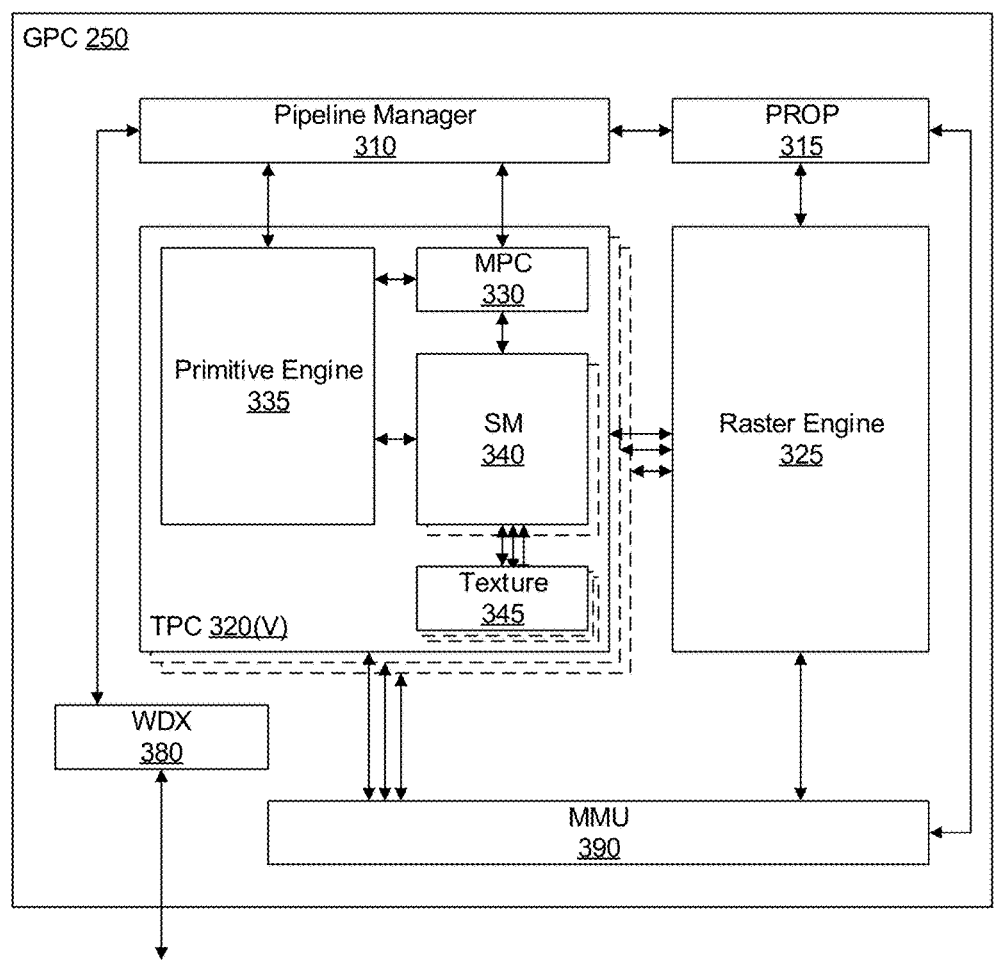
FIG. 3A illustrates a general processing cluster of the parallel processing unit of FIG. 2, in accordance with one embodiment.

FIG. 3A illustrates a GPC 250 of the PPU 200 of FIG. 2, in accordance with one embodiment. As shown in FIG. 3A, each GPC 250 includes a number of hardware units for processing tasks. In one embodiment, each GPC 250 includes a pipeline manager 310, a pre-raster operations unit (PROP) 315, a raster engine 325, a work distribution crossbar (WDX) 380, a memory management unit (MMU) 390, and one or more Texture Processing Clusters (TPCs) 320. It will be appreciated that the GPC 250 of FIG. 3A may include other hardware units in lieu of or in addition to the units shown in FIG. 3A.

In one embodiment, the operation of the GPC 250 is controlled by the pipeline manager 310. The pipeline manager 310 manages the configuration of the one or more TPCs 320 for processing tasks allocated to the GPC 250. In one embodiment, the pipeline manager 310 may configure at least one of the one or more TPCs 320 to implement at least a portion of a graphics rendering pipeline. For example, a TPC 320 may be configured to execute a vertex shader program on the programmable streaming multiprocessor (SM) 340. The pipeline manager 310 may also be configured to route packets received from the work distribution unit 225 to the appropriate logical units within the GPC 250. For example, some packets may be routed to fixed function hardware units in the PROP 315 and/or raster engine 325 while other packets may be routed to the TPCs 320 for processing by the primitive engine 335 or the SM 340.

The PROP unit 315 is configured to route data generated by the raster engine 325 and the TPCs 320 to a Raster Operations (ROP) unit in the partition unit 280, described in more detail below. The PROP unit 315 may also be configured to perform optimizations for color blending, organize pixel data, perform address translations, and the like.

The raster engine 325 includes a number of fixed function hardware units configured to perform various raster operations. In one embodiment, the raster engine 325 includes a setup engine, a course raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine may transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 380 comprises fragments to be processed, for example, by a fragment shader implemented within a TPC 320.

Each TPC 320 included in the GPC 250 includes an M-Pipe Controller (MPC) 330, a primitive engine 335, one or more SMs 340, and one or more texture units 345. The MPC 330 controls the operation of the TPC 320, routing packets received from the pipeline manager 310 to the appropriate units in the TPC 320. For example, packets associated with a vertex may be routed to the primitive engine 335, which is configured to fetch vertex attributes associated with the vertex from the memory 204. In contrast, packets associated with a shader program may be transmitted to the SM 340.

In one embodiment, the texture units 345 are configured to load texture maps (e.g., a 2D array of texels) from the memory 204 and sample the texture maps to produce sampled texture values for use in shader programs executed by the SM 340. The texture units 345 implement texture operations such as filtering operations using mip-maps (i.e., texture maps of varying levels of detail). The texture unit 345 is also used as the Load/Store path for SM 340 to MMU 390. In one embodiment, each TPC 320 includes two (2) texture units 345.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In one embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 340 may be described in more detail below in conjunction with FIG. 4.

The MMU 390 provides an interface between the GPC 250 and the partition unit 280. The MMU 390 may provide translation of virtual addresses into physical addresses, memory protection, and arbitration of memory requests. In one embodiment, the MMU 390 provides one or more translation lookaside buffers (TLBs) for improving translation of virtual addresses into physical addresses in the memory 204.

Figure 3B:
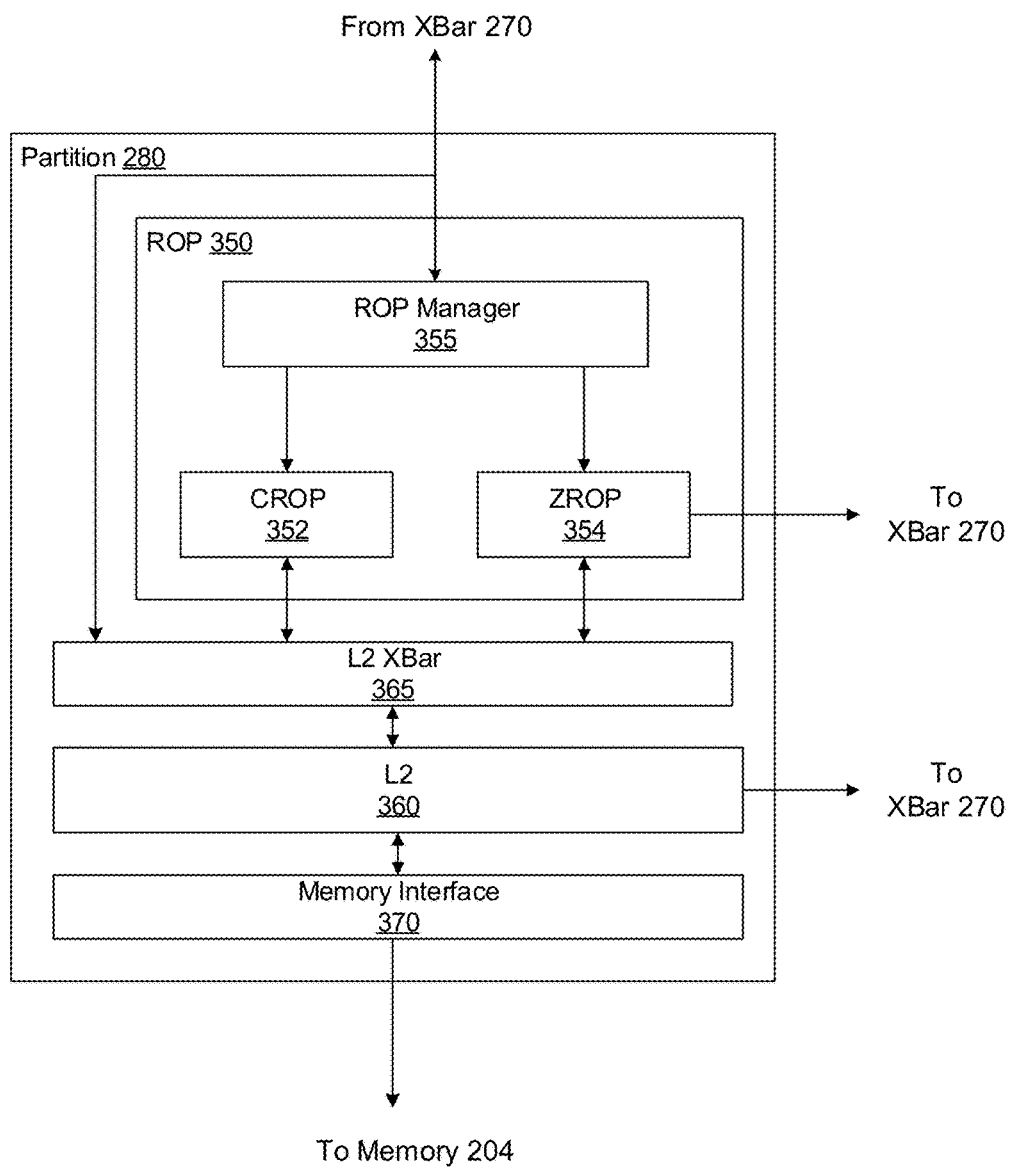
FIG. 3B illustrates a partition unit of the parallel processing unit of FIG. 2, in accordance with one embodiment.

FIG. 3B illustrates a partition unit 280 of the PPU 200 of FIG. 2, in accordance with one embodiment. As shown in FIG. 3B, the partition unit 280 includes a Raster Operations (ROP) unit 350, a level two (L2) cache 360, a memory interface 370, and an L2 crossbar (XBar) 365. The memory interface 370 is coupled to the memory 204. Memory interface 370 may implement 16, 32, 64, 128-bit data buses, or the like, for high-speed data transfer. In one embodiment, the PPU 200 comprises U memory interfaces 370, one memory interface 370 per partition unit 280, where each partition unit 280 is connected to a corresponding memory device 204. For example, PPU 200 may be connected to up to U memory devices 204, such as graphics double-data-rate, version 5, synchronous dynamic random access memory (GDDR5 SDRAM). In one embodiment, the memory interface 370 implements a DRAM interface and U is equal to 8.

In one embodiment, the PPU 200 implements a multi-level memory hierarchy. The memory 204 is located off-chip in SDRAM coupled to the PPU 200. Data from the memory 204 may be fetched and stored in the L2 cache 360, which is located on-chip and is shared between the various GPCs 250. As shown, each partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 includes a ROP Manager 355, a Color ROP (CROP) unit 352, and a Z ROP (ZROP) unit 354. The CROP unit 352 performs raster operations related to pixel color, such as color compression, pixel blending, and the like. The ZROP unit 354 implements depth testing in conjunction with the raster engine 325. The ZROP unit 354 receives a depth for a sample location associated with a pixel fragment from the culling engine of the raster engine 325. The ZROP unit 354 tests the depth against a corresponding depth in a depth buffer for a sample location associated with the fragment. If the fragment passes the depth test for the sample location, then the ZROP unit 354 updates the depth buffer and transmits a result of the depth test to the raster engine 325. The ROP Manager 355 controls the operation of the ROP unit 350. It will be appreciated that the number of partition units 280 may be different than the number of GPCs 250 and, therefore, each ROP unit 350 may be coupled to each of the GPCs 250. Therefore, the ROP Manager 355 tracks packets received from the different GPCs 250 and determines which GPC 250 that a result generated by the ROP unit 350 is routed to. The CROP unit 352 and the ZROP unit 354 are coupled to the L2 cache 360 via an L2 XBar 365.

Figure 4:
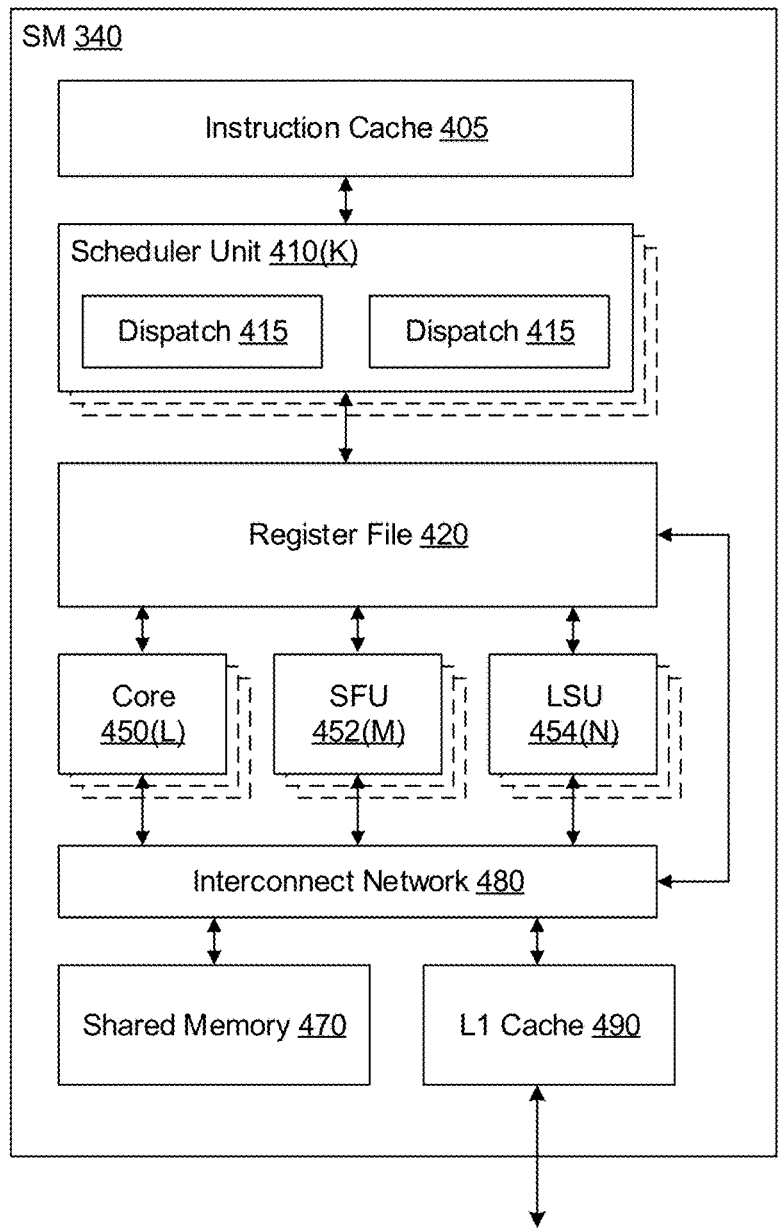
FIG. 4 illustrates the streaming multi-processor of FIG. 3A, in accordance with one embodiment.

FIG. 4 illustrates the streaming multi-processor 340 of FIG. 3A, in accordance with one embodiment. As shown in FIG. 4, the SM 340 includes an instruction cache 405, one or more scheduler units 410, a register file 420, one or more processing cores 450, one or more special function units (SFUs) 452, one or more load/store units (LSUs) 454, an interconnect network 480, a shared memory 470 and an L1 cache 490.

As described above, the work distribution unit 225 dispatches tasks for execution on the GPCs 250 of the PPU 200. The tasks are allocated to a particular TPC 320 within a GPC 250 and, if the task is associated with a shader program, the task may be allocated to an SM 340. The scheduler unit 410 receives the tasks from the work distribution unit 225 and manages instruction scheduling for one or more groups of threads (i.e., warps) assigned to the SM 340. The scheduler unit 410 schedules threads for execution in groups of parallel threads, where each group is called a warp. In one embodiment, each warp includes 32 threads. The scheduler unit 410 may manage a plurality of different warps, scheduling the warps for execution and then dispatching instructions from the plurality of different warps to the various functional units (i.e., cores 350, SFUs 352, and LSUs 354) during each clock cycle.

In one embodiment, each scheduler unit 410 includes one or more instruction dispatch units 415. Each dispatch unit 415 is configured to transmit instructions to one or more of the functional units. In the embodiment shown in FIG. 4, the scheduler unit 410 includes two dispatch units 415 that enable two different instructions from the same warp to be dispatched during each clock cycle. In alternative embodiments, each scheduler unit 410 may include a single dispatch unit 415 or additional dispatch units 415.

Each SM 340 includes a register file 420 that provides a set of registers for the functional units of the SM 340. In one embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450. In one embodiment, the SM 340 includes a large number (e.g., 128, etc.) of distinct processing cores 450. Each core 450 may include a fully-pipelined, single-precision processing unit that includes a floating point arithmetic logic unit and an integer arithmetic logic unit. The core 450 may also include a double-precision processing unit including a floating point arithmetic logic unit. In one embodiment, the floating point arithmetic logic units implement the IEEE 754-2008 standard for floating point arithmetic. Each SM 340 also comprises M SFUs 452 that perform special functions (e.g., attribute evaluation, reciprocal square root, and the like), and N LSUs 454 that implement load and store operations between the shared memory 470 or L1 cache 490 and the register file 420. In one embodiment, the SM 340 includes 128 cores 450, 32 SFUs 452, and 32 LSUs 454.

Each SM 340 includes an interconnect network 480 that connects each of the functional units to the register file 420 and the LSU 454 to the register file 420, shared memory 470 and L1 cache 490. In one embodiment, the interconnect network 480 is a crossbar that can be configured to connect any of the functional units to any of the registers in the register file 420 and connect the LSUs 454 to the register file and memory locations in shared memory 470 and L1 cache 490.

The shared memory 470 is an array of on-chip memory that allows for data storage and communication between the SM 340 and the primitive engine 335 and between threads in the SM 340. In one embodiment, the shared memory 470 comprises 64 KB of storage capacity. An L1 cache 490 is in the path from the SM 340 to the partition unit 280. The L1 cache 490 can be used to cache reads and writes. In one embodiment, the L1 cache 490 comprises 24 KB of storage capacity.

The PPU 200 described above may be configured to perform highly parallel computations much faster than conventional CPUs. Parallel computing has advantages in graphics processing, data compression, biometrics, stream processing algorithms, and the like.

When configured for general purpose parallel computation, a simpler configuration can be used. In this model, as shown in FIG. 2, fixed function graphics processing units are bypassed, creating a much simpler programming model. In this configuration, the Work Distribution Unit 225 assigns and distributes blocks of threads directly to the TPCs 320. The threads in a block execute the same program, using a unique thread ID in the calculation to ensure each thread generates unique results, using the SM 340 to execute the program and perform calculations, shared memory 470 communicate between threads, and the LSU 454 to read and write Global memory through partition L1 cache 490 and partition unit 280.

When configured for general purpose parallel computation, the SM 340 can also write commands that scheduler unit 220 can use to launch new work on the TPCs 320.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display).

An application writes model data for a scene (i.e., a collection of vertices and attributes) to a memory such as a system memory or memory 204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 340 of the PPU 200 including one or more of a vertex shader, hull shader, domain shader, geometry shader, and a pixel shader. For example, one or more of the SMs 340 may be configured to execute a vertex shader program that processes a number of vertices defined by the model data. In one embodiment, the different SMs 340 may be configured to execute different shader programs concurrently. For example, a first subset of SMs 340 may be configured to execute a vertex shader program while a second subset of SMs 340 may be configured to execute a pixel shader program. The first subset of SMs 340 processes vertex data to produce processed vertex data and writes the processed vertex data to the L2 cache 360 and/or the memory 204. After the processed vertex data is rasterized (i.e., transformed from three-dimensional data into two-dimensional data in screen space) to produce fragment data, the second subset of SMs 340 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 5:
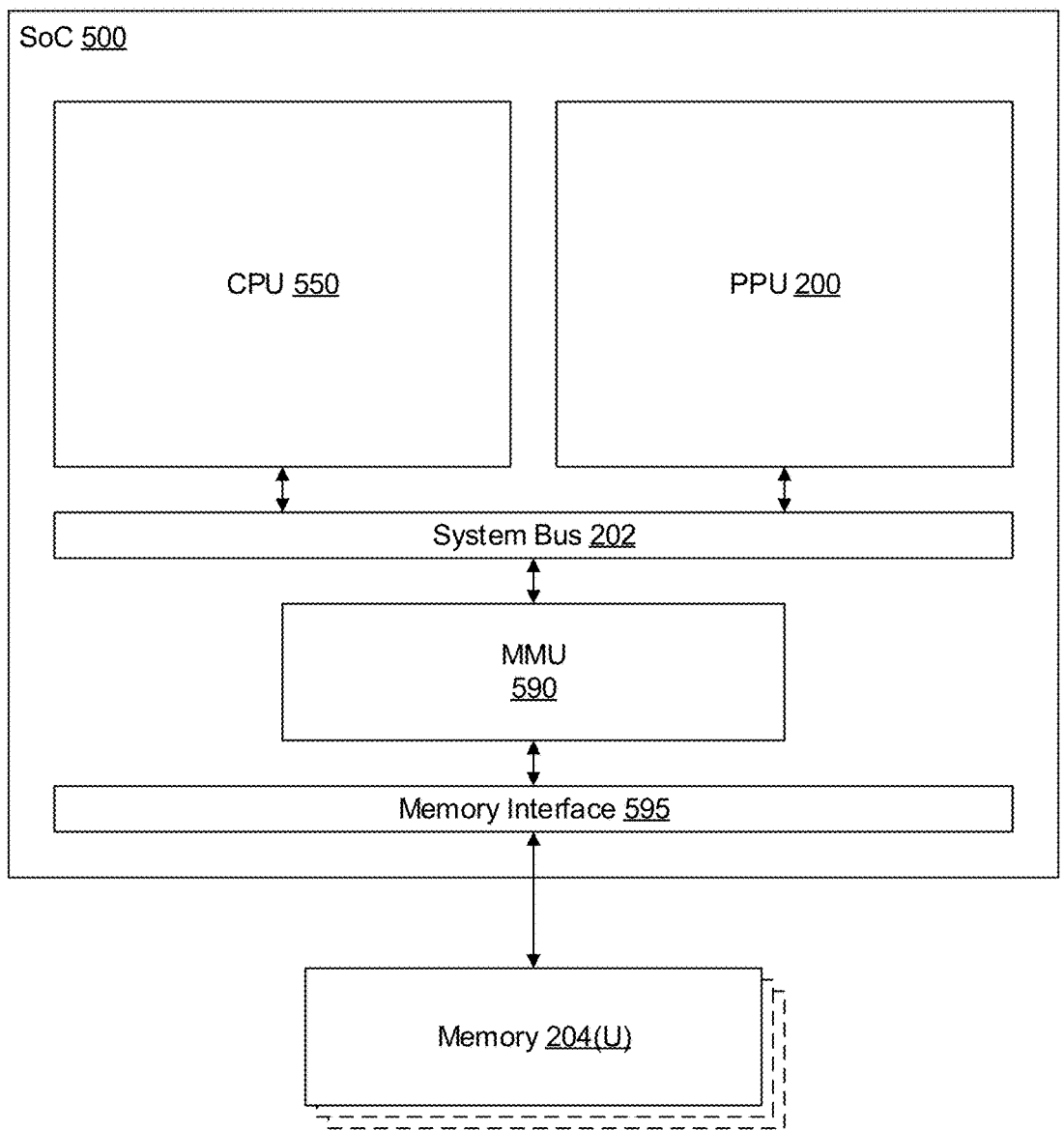
FIG. 5 illustrates a system-on-chip including the parallel processing unit of FIG. 2, in accordance with one embodiment.

FIG. 5 illustrates a System-on-Chip (SoC) 500 including the PPU 200 of FIG. 2, in accordance with one embodiment. As shown in FIG. 5, the SoC 500 includes a CPU 550 and a PPU 200, as described above. The SoC 500 may also include a system bus 202 to enable communication between the various components of the SoC 500. Memory requests generated by the CPU 550 and the PPU 200 may be routed through a system MMU 590 that is shared by multiple components of the SoC 500. The SoC 500 may also include a memory interface 595 that is coupled to one or more memory devices 204. The memory interface 595 may implement, e.g., a DRAM interface.

Although not shown explicitly, the SoC 500 may include other components in addition to the components shown in FIG. 5. For example, the SoC 500 may include multiple PPUs 200 (e.g., four PPUs 200), a video encoder/decoder, and a wireless broadband transceiver as well as other components. In one embodiment, the SoC 500 may be included with the memory 204 in a package-on-package (PoP) configuration.

Figure 6:
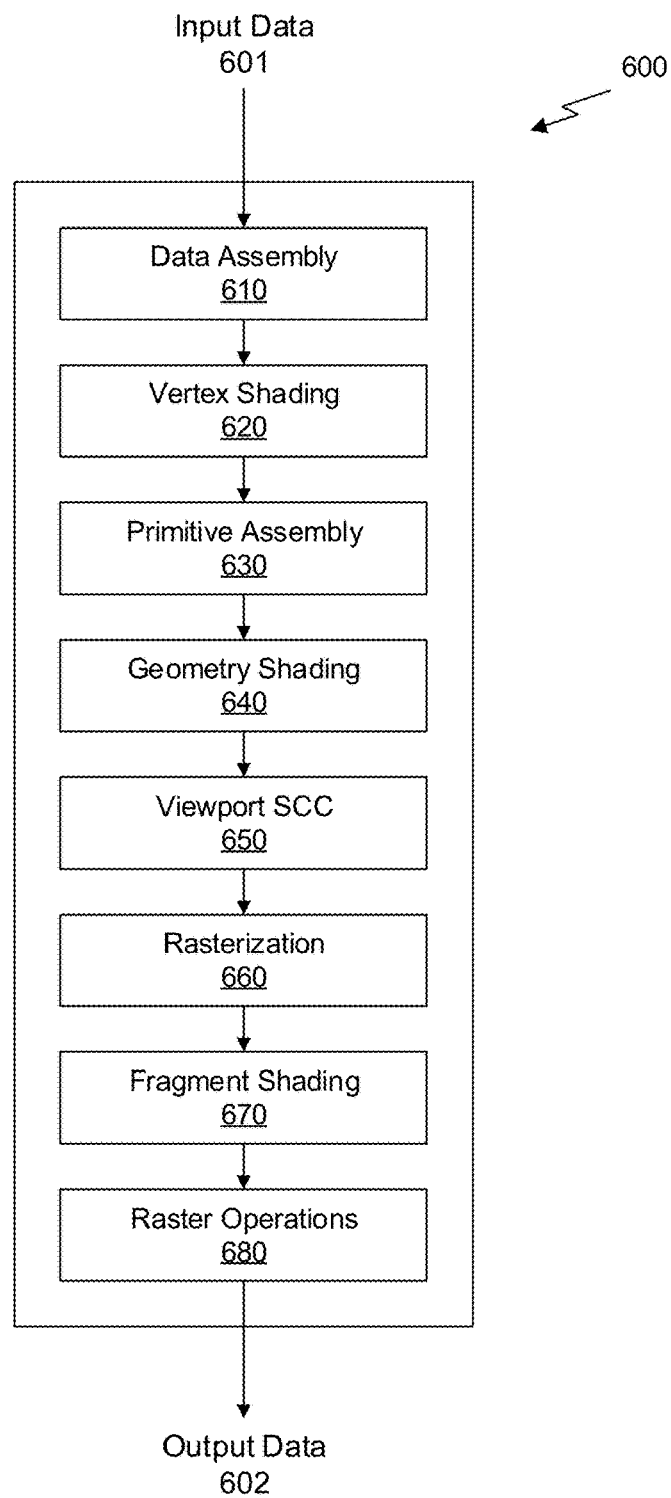
FIG. 6 is a conceptual diagram of a graphics processing pipeline implemented by the parallel processing unit of FIG. 2, in accordance with one embodiment.

FIG. 6 is a conceptual diagram of a graphics processing pipeline 600 implemented by the PPU 200 of FIG. 2, in accordance with one embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In one embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In one embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (i.e., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (i.e., a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (i.e., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (i.e., a collection of associated vertices) to the geometry shading stage 640.

The geometry shading stage 640 processes geometric primitives by performing a set of operations (i.e., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In one embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in one embodiment, the viewport SCC stage 650 may utilize the data. In one embodiment, primitive data processed by one or more of the stages in the graphics processing pipeline 600 may be written to a cache (e.g. L1 cache, a vertex cache, etc.). In this case, in one embodiment, the viewport SCC stage 650 may access the data in the cache. In one embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In one embodiment, z-testing may also be performed to determine if the geometric primitive is occluded by other geometric primitives that have already been rasterized. The rasterization stage 660 generates fragment data (i.e., interpolated vertex attributes associated with a particular sample location for each covered pixel) that are transmitted to the fragment shading stage 670.

The fragment shading stage 670 processes fragment data by performing a set of operations (i.e., a fragment shader or a program) on each of the fragments. The fragment shading stage 670 may generate pixel data (i.e., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (i.e., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 200. Other stages of the graphics processing pipeline 600 may be implemented by programmable hardware units such as the SM 340 of the PPU 200.

The graphics processing pipeline 600 may be implemented via an application executed by a host processor, such as a CPU 550. In one embodiment, a device driver may implement an application programming interface (API) that defines various functions that can be utilized by an application in order to generate graphical data for display. The device driver is a software program that includes a plurality of instructions that control the operation of the PPU 200. The API provides an abstraction for a programmer that lets a programmer utilize specialized graphics hardware, such as the PPU 200, to generate the graphical data without requiring the programmer to utilize the specific instruction set for the PPU 200. The application may include an API call that is routed to the device driver for the PPU 200. The device driver interprets the API call and performs various operations to respond to the API call. In some instances, the device driver may perform operations by executing instructions on the CPU 550. In other instances, the device driver may perform operations, at least in part, by launching operations on the PPU 200 utilizing an input/output interface between the CPU 550 and the PPU 200. In one embodiment, the device driver is configured to implement the graphics processing pipeline 600 utilizing the hardware of the PPU 200.

Various programs may be executed within the PPU 200 in order to implement the various stages of the graphics processing pipeline 600. For example, the device driver may launch a kernel on the PPU 200 to perform the vertex shading stage 620 on one SM 340 (or multiple SMs 340). The device driver (or the initial kernel executed by the PPU 200) may also launch other kernels on the PPU 200 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 200. It will be appreciated that results from one kernel may be processed by one or more intervening fixed function hardware units before being processed by a subsequent kernel on an SM 340.

Figure 7:
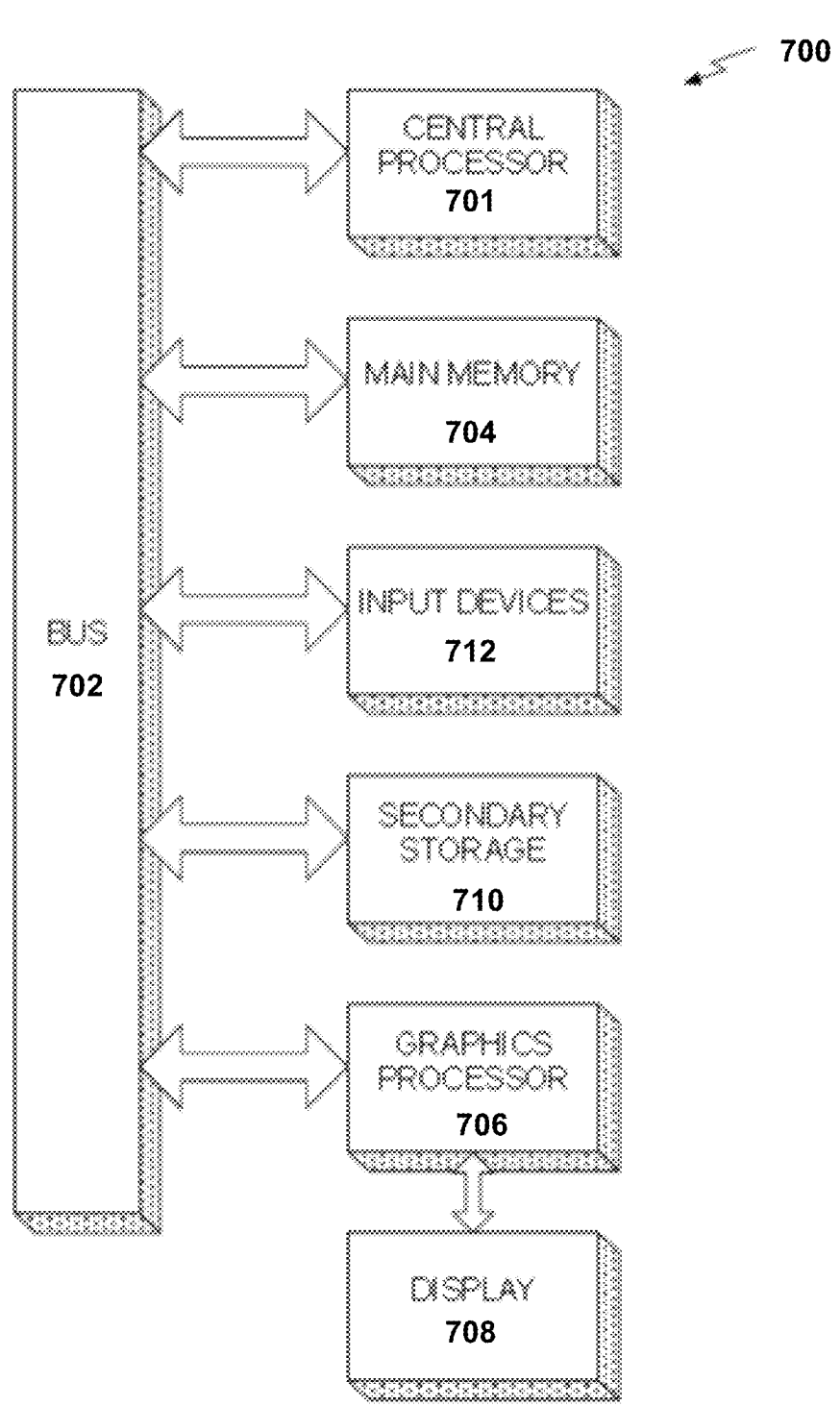
FIG. 7 illustrates an exemplary system in which the various architecture and/or functionality of all embodiments may be implemented.

FIG. 7 illustrates an exemplary system 700 in which the various architecture and/or functionality of the various previous embodiments may be implemented. As shown, a system 700 is provided including at least one central processor 701 that is connected to a communication bus 702. The communication bus 702 may be implemented using any suitable protocol, such as PCI (Peripheral Component Interconnect), PCI-Express, AGP (Accelerated Graphics Port), HyperTransport, or any other bus or point-to-point communication protocol(s). The system 700 also includes a main memory 704. Control logic (software) and data are stored in the main memory 704 which may take the form of random access memory (RAM).

The system 700 also includes input devices 712, a graphics processor 706, and a display 708, i.e. a conventional CRT (cathode ray tube), LCD (liquid crystal display), LED (light emitting diode), plasma display or the like. User input may be received from the input devices 712, e.g., keyboard, mouse, touchpad, microphone, and the like. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 704 and/or the secondary storage 710. Such computer programs, when executed, enable the system 700 to perform various functions. The memory 704, the storage 710, and/or any other storage are possible examples of computer-readable media.

In one embodiment, the architecture and/or functionality of the various previous figures may be implemented in the context of the central processor 701, the graphics processor 706, an integrated circuit (not shown) that is capable of at least a portion of the capabilities of both the central processor 701 and the graphics processor 706, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, laptop computer, server, workstation, game consoles, embedded system, and/or any other type of logic. Still yet, the system 700 may take the form of various other devices including, but not limited to a personal digital assistant (PDA) device, a mobile phone device, a television, etc.

Further, while not shown, the system 700 may be coupled to a network (e.g., a telecommunications network, local area network (LAN), wireless network, wide area network (WAN) such as the Internet, peer-to-peer network, cable network, or the like) for communication purposes.

Foveated Light Field Rendering

Overview

In one embodiment, light field displays may be used to enable a comfortable visual experience for virtual reality and immersive displays. However, content for these displays are very expensive to render. For example, a variety of applications such as virtual reality and immersive displays may require high image quality, low rendering latency, and consistent depth cues. Light field displays may provide an improved visual experience by supporting focal cues, and can be implemented in various forms including desktop displays and head-mounted displays.

Light field rendering may be accelerated with foveation by augmenting any light field display with an eye/gaze-tracking device. For example, an eye-tracker may be used to locate the gaze position within a scene, and render with high detail around this region and less detail in the peripheral region within the scene.

Human visual systems can resolve higher spatial frequencies in the fovea than in the periphery. In one embodiment, a theoretical lower bound may be derived for the number of samples needed to be sampled. This bound may be used to formulate a content-adaptive importance sampling in the 4D ray space (e.g., where 4D may refer to dimensional info in each pixel (X, Y, and angles of incoming light rays)).

Many applications, such as virtual reality and immersive displays, may require high image quality, low rendering latency, and consistent depth cues. Despite advances in graphics hardware and rendering algorithms, design for perceptual comfort may be desired. Light-field displays may support focal cues, but current rendering techniques may not generate high quality content in real time. Foveated rendering may reduce computational costs while maintaining perceptual quality, but existing methods do not apply to 4D light field displays with focal cues.

In one embodiment, a foveated light field rendering and display system may support low latency and high quality, as well as focal cues, to improve depth perception and avoid vergence accommodation conflict. In another embodiment, the importance sampling in the 4D light field ray space may be derived based on both the foveation and accommodation of human visual systems. Conceptually, this may be achieved by tracing rays from retina cells back through the eye and into the scene, and varying the focal length of the eye to sweep the ray space.

In another embodiment, the whole light field system may be analyzed, including the display, the eye lens, and the eye retina, in both the primary and frequency domains. Specific spectral bounds may be derived for various components, and these bounds may be validated with a pilot perceptual study. Based on this perceptual model, a 4D light field sampling methodology may be implemented for foveated light field rendering.

Frequency Bounds Analysis

Light field displays may offer more comfortable experiences in 3D TV and virtual reality head-mounted displays by supporting proper focus cues, which avoid the eye strain and sickness generated by vergence and accommodation conflict when 3D contents are shown on traditional stereoscopic or head-mounted displays. Supporting accommodation for a light field display may include dense sampling of the content from multiple viewpoints, which may be orders of magnitude more expensive to render than single views. To reduce the bandwidth required to sample the light field content, in the frequency domain several spatial-angular bandwidth bounds may be derived in the realms of display, lens, and retina.

Ray Space Analysis

In one embodiment, an observer may focus on a light field display at a distance $d_d=(d_e f_d)/(d_e-f_d)$ where $f_d$ is the focal length of the eye when focusing on the display and $d_e$ is the diameter of the eyeball. The display light field $L_d$ may propagate along the free space and may be refracted by the eye lens, and the retina may receive an image I by integrating the retinal light field L along the angular dimension u parameterized at the pupil:

$$I(x) = \int L(x, u) \sqcap (u/a) du \qquad (1)$$
$$= \int L_d(\phi(x, u), u) \sqcap (u/a) du,$$

where a is the pupil aperture, $\pi(\cdot)$ is the rectangular function, and $\varphi$ maps the intersection of a retinal light ray (x, u) with the display spatial point $x_d$:

$$x_d = \phi(x, u) = -\frac{d_d}{d_e}x + d_d k(d_d, f_d)u, \qquad (2)$$

$$k(d, f) = \left(\frac{1}{d_e} - \frac{1}{f} + \frac{1}{d}\right).$$

For an out-of-focus virtual object being presented at a distance $d_o \neq d_d$ to the eye, its corresponding retinal light field may be obtained through the inverse mapping of Equation (2), with slope $$k(d_o, f_d)=(d_e\kappa(d_o, f_d))^{-1} \qquad (3)$$

in the flatland diagram. Since integrate all rays may be integrated over the pupil to obtain the retinal image in Equation (1), the image may be blurred by a retinal Circle-of-Confusion (CoC) of diameter $$CoC = \frac{a}{k(d_o, f_d)} = ad_e k(d_o, f_d). \qquad (4)$$

In the case of an out-of-focus object, it may be intuitively sampled it at frequency inversely proportional to the circle-of-confusion size. Additionally, rendering cost may be dramatically reduced as well at large eccentricity. Further, through Fourier analysis, more theoretical bounds for saving may be revealed in both spatial and angular dimensions.

Frequency Domain Analysis

The frequency spectrum of the integrated retinal image in Equation (1) may be obtained through a Fourier slice theorem:

$$\hat{I}(\omega_x)=(\hat{L}*\hat{\sqcap})(\omega_x, \omega_u=0), \qquad (5)$$

where the symbol $\hat{\cdot}$ denotes Fourier transform and the operator * denotes convolution. For the out-of-focused object with slope $k(d_o, f_d)$ in the primary domain, its frequency domain slope is:

$$\hat{k}(d_o, f_d)=-\kappa(d_o, f_d)d_e. \qquad (6)$$

Specific bounds are derived below.

Display Bound

For any content shown on a regularly sampled display, proper anti-aliasing may be required to avoid frequency masking. When an object extends beyond the depth of field (DoF) of the light field display, the spatial domain may be subject to clipping and thus may be low-pass filtered due to the narrower bandwidth in display angular sampling. The reduced bound on the spatial domain due to display capability is given by $$B_{\omega_x}^{display} = \begin{cases} \dfrac{1}{2\Delta u \hat{k}(d_o, f_d)}, & \text{if } \hat{k}(d_o, f_d) \geq \dfrac{\frac{d_e}{d_o}\Delta x}{\Delta u} \\ \dfrac{d_o}{2d_e \Delta x}, & \text{otherwise,} \end{cases} \qquad (7)$$

where $\dfrac{d_e}{d_o}\Delta x$ is the display spatial sampling period projected onto the retina, and $\Delta u$ is the angular sampling period of the light field display.

Lens Bound

For an out-of-focused object, its perceivable frequency spectrum may be governed by the energy contributed to the slicing axis $\omega_u=0$ in Equation (5) through convolution with the Fourier transformed pupil function $\hat{\sqcap}(u/a)=\sin c(a\omega_u)$. For a defocused object with primary-domain slope $k(d_o, f_d)$, the perceivable spatial energy is governed by $\sin c(ad_e\kappa(d_o, f_d))=\sin c(a\hat{k}(d_o, f_d))$, which is exactly the result obtained from the Fourier transform of the circle-of-confusion in Equation (4). Because sin c degrades rapidly after its first half cycle $\pi$, we may derive the spatial bandwidth $B_{\omega_x}^{lens}=a|\hat{k}(d_o, f_d)|$ and deduce the corresponding angular bandwidth $$B_{\omega_u}^{lens} = \begin{cases} a|\hat{k}(d_o, f_d)|^2, & \text{if } a|\hat{k}(d_o, f_d)|^2 \leq \dfrac{1}{2\Delta u} \\ \dfrac{1}{2\Delta u}, & \text{otherwise.} \end{cases} \qquad (8)$$

Since the bounds are primarily limited by the pupil aperture a, when sampling an object outside the (assumed) focal plane of the eye, only the spatial-angular frequency lower than that of the light field display may need to be considered.

Retina Bound

The retinal spatial sampling and resolution may decrease with eccentricity primarily because the midget Retinal Ganglion Cell receptor field (mRGCf) increases its dendritic field size with larger eccentricity while maintaining a constant area sampling over the visual field. This result may be used in reducing the rendering cost by exploiting the lower spatial resolution and shading rate across the retina eccentricity through user studies. Before illustrating how the spatial resolution bound can be derived as a function of retinal eccentricity, the outcome impacting the sampling for light field content may be illustrated.

Again, for an object outside the focusing plane, assuming the retinal spatial bandwidth is given by $B_{\omega_x}^{retina}(x)$, the bound on the retinal angular for this object may be obtained by clipping the object's spectrum with the spatial bound:

$$B_{\omega_u}^{retina}(x)=\hat{k}(d_o, f_d)B_{\omega_x}^{retina}(x). \qquad (9)$$

Note that the angular bound may depend on both content depth and retinal spatial bound at different eccentricity, and an example shows different angular bounds for objects at the same eccentricity. In practice, there may be many spatial and angular bounds to consider in the sampling stage. For example, objects with different defocus blurs with large point spread sizes at far periphery may be sampled similarly because the retinal spatial bandwidth is smaller than their optical spatial bandwidth, while their angular samples are still different. In one embodiment, the spatial resolution limit may be estimated across the retinal eccentricity, and the result may be compared with the bandwidth derived from the anatomical receptor field size.

How Many Rays do We Need?

A determination may be made as to how many rays entering the pupil, i.e. the angular sampling rate, are needed for a light field display to support proper focus cue. Several factors may affect the final perceivable image, including the display, the optics of the eye, the anatomy of the retina, and the content distributed in space. Although the foveal spatial resolution can be high (e.g., 60 cycles/degree), the display spatial and angular bandwidth may set the bounds of sampling for objects outside the depth of field of the display. However, as the retinal spatial bandwidth quickly drops to a fraction of the foveal bandwidth, the bound on angular bandwidth may also linearly decreases, as shown in Equation (9); the overall saving on rendering may extends well to the 4D light field. These results may apply to emerging foveated light field displays.

Blur Detection and Light Field Bandwidth

One goal in rendering foveated light field may be to sample the 4D information as succinctly as possible (e.g., use the fewest number of rays to represent objects at different depths and eccentricities without letting the user notice the differences). An extreme case may be to replace the peripheral 4D light field rendering with a 2D billboard, but the sensitivity and detection threshold needs to be found. The ultimate judge for this approach may be the human visual system. In one embodiment, visual acuity may fall monotonically as the visual eccentricity grows, and the fall-off may be known to follow the density of ganglion cells. A model may be constructed that predicts the receptive field density of midget ganglion cells as a function of retinal eccentricity $r=\sqrt{x^2+y^2}$ for $(x, y) \in x$ and the meridian type k:

$$\rho(r, k) = 2 \times \rho_{cone}\left(1 + \frac{r}{41.03}\right)^{-1} \times \left[a_k\left(1 + \frac{r}{r_{2,k}}\right)^{-2} + (1 - a_k)\exp\left(-\frac{r}{r_{e,k}}\right)\right], \quad (10)$$

where $\rho_{cone}=14,804.6 \text{ deg}^{-2}$ is the density of cone cell at fovea and $a_k$, $r_{2,k}$, $r_{e,k}$ are all fitting constants along the four meridians of the visual field. In practice, the extension to arbitrary retinal location for hexagonal receptive field spacing may also be useful:

$$\sigma(x) = \sigma(x, y) = \frac{1}{r}\sqrt{\frac{2}{\sqrt{3}}\left(\frac{x^2}{\rho(r, 1)} + \frac{y^2}{\rho(r, 2)}\right)}, \quad (11)$$

and the retinal spatial bandwidth may be obtained as:

$$B_{\omega_x}^{retina}(x) = 1/(2\sigma(x)). \quad (12)$$

Angular Bandwidth and Depth Perception

Reduction in spatial bandwidth may lead to narrower angular bandwidth as suggested by Equation (9). Additional reduction in angular bandwidth may be possible if the visual system is not sensitive to changes in focal cue in the periphery. Specifically, it may be determined whether there are conditions in which angular sampling may be omitted without the visual system detecting it. The investigation may be started with behavioral data. The ability to tell the change in blur may be an important factor because the inability to do so may prevent higher-level perception and provoke vergence-accommodation conflict. The thresholds of blur detection (recognition of existence of blur) and blur discrimination (recognition of the difference in the sizes of blur) may be measured at various eccentricities (e.g., ranging from the fovea to 8 degrees of eccentricity). The thresholds may increase monotonically as a function of eccentricity for both detection (e.g., 0.53D to 1.25D) and discrimination (e.g., 0.29D to 0.72D). Blur detection threshold may also be measured at farther visual eccentricities, where it may increase (e.g., from 2 to 5D at 7 degrees of eccentricity to 7 to 12D at 60 degrees of eccentricity).

The monotonic increase in the threshold values may suggest more chance for omitting angular sampling in the periphery; angular sampling may be omitted for certain objects if the visual system cannot appreciate their focal cues.

Receptive Field Density of Retinal Cells

In one embodiment, the receptive field density of retinal cells may be determined and set as the maximum spatial sampling resolution. The maximum spatial sampling resolution may then be used to reduce the rendering cost of a light field display, depending on the distance of material in the scene from the tracked gaze.

As the spatial sampling rate decreases across at farther eccentricity, the angular sampling may be reduced as well, and the sampling rate may depend on both the depth of the object and the spatial sampling bandwidth at the given eccentricity. In one embodiment, while the spatial sampling rate of the retina is smaller than that offered by the display, the spatial pixels may be subsampled, and the number of views may be reduced, since the required angular sampling bandwidth may be smaller than that offered by the display. In another embodiment, when rendering content for far-peripheral vision, the angular views may be further down sampled according to the determined slope (e.g., depth of the object) and the corresponding receptive field density.

Light Field View Sampling

Figure 8:
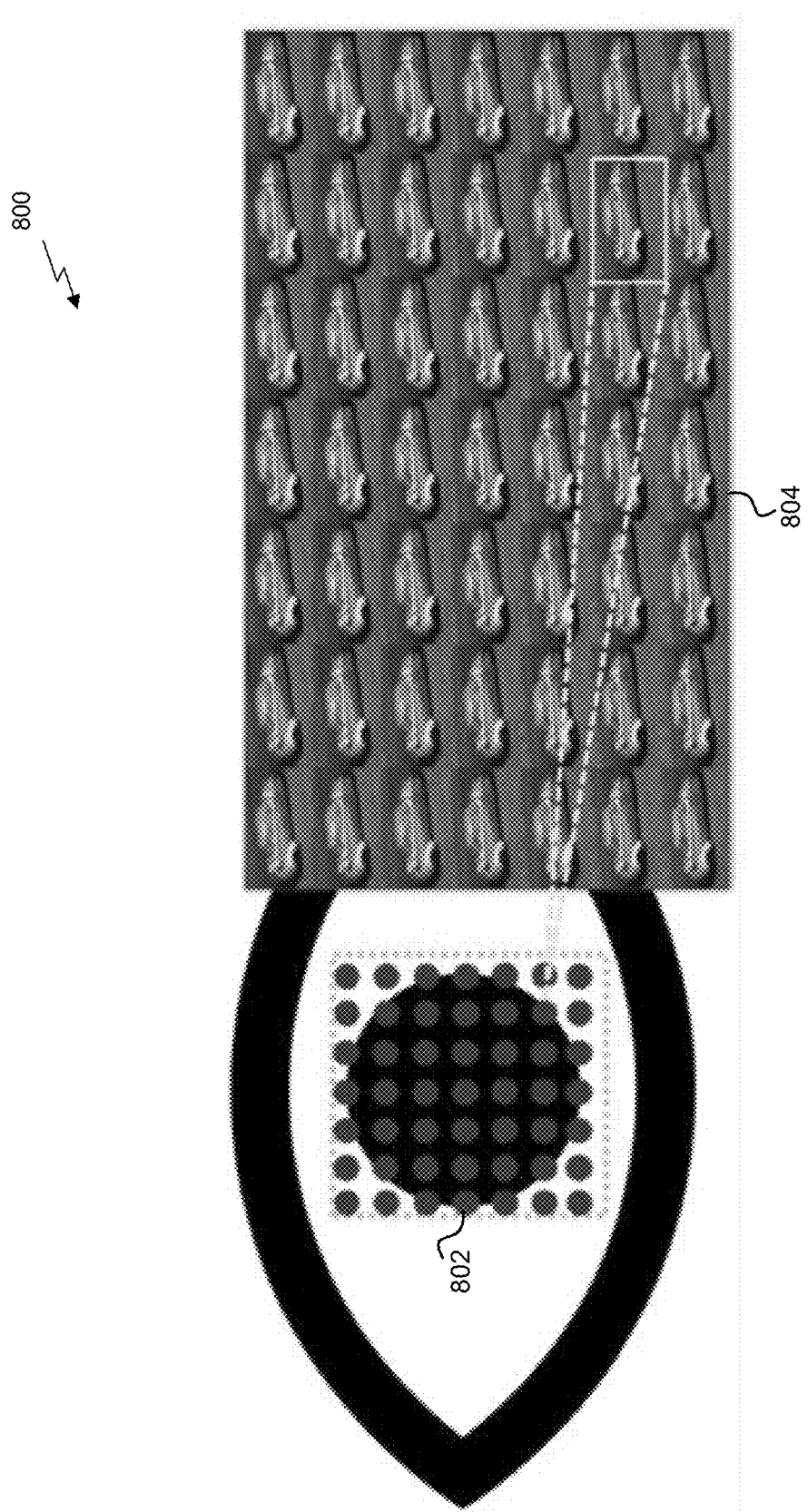
FIG. 8 illustrates an exemplary light view sampling implementation with an eye-box and corresponding views, in accordance with one embodiment.

Light field view sampling may require densely rendering the same 3D scene from different baseline points (e.g., virtual camera locations) across the eye-box. FIG. 8 illustrates an exemplary light view sampling implementation 800 with an eye-box 802 and corresponding views 804. As shown in FIG. 8, a predetermined number of views 804 (e.g., 7×7, etc.) may be rendered, with each virtual camera separated by a predetermined space (e.g., 1 mm, etc.) within the eye-box 802 on the pupil plane. However, sampling a large number of views in full-resolution requires shading a large number of pixels, which may not be practical for a real-time application.

As a solution, using an eye/gaze tracker together with the light field display may allow for rendering the region of interest within the displayed scene with high spatial-angular details, and rendering the rest of the scene more sparsely at lower computational cost. Virtual reality displays may benefit from this implementation, since a large field of view is expected for only one viewer using those displays.

Exemplary Implementation

Figure 9:
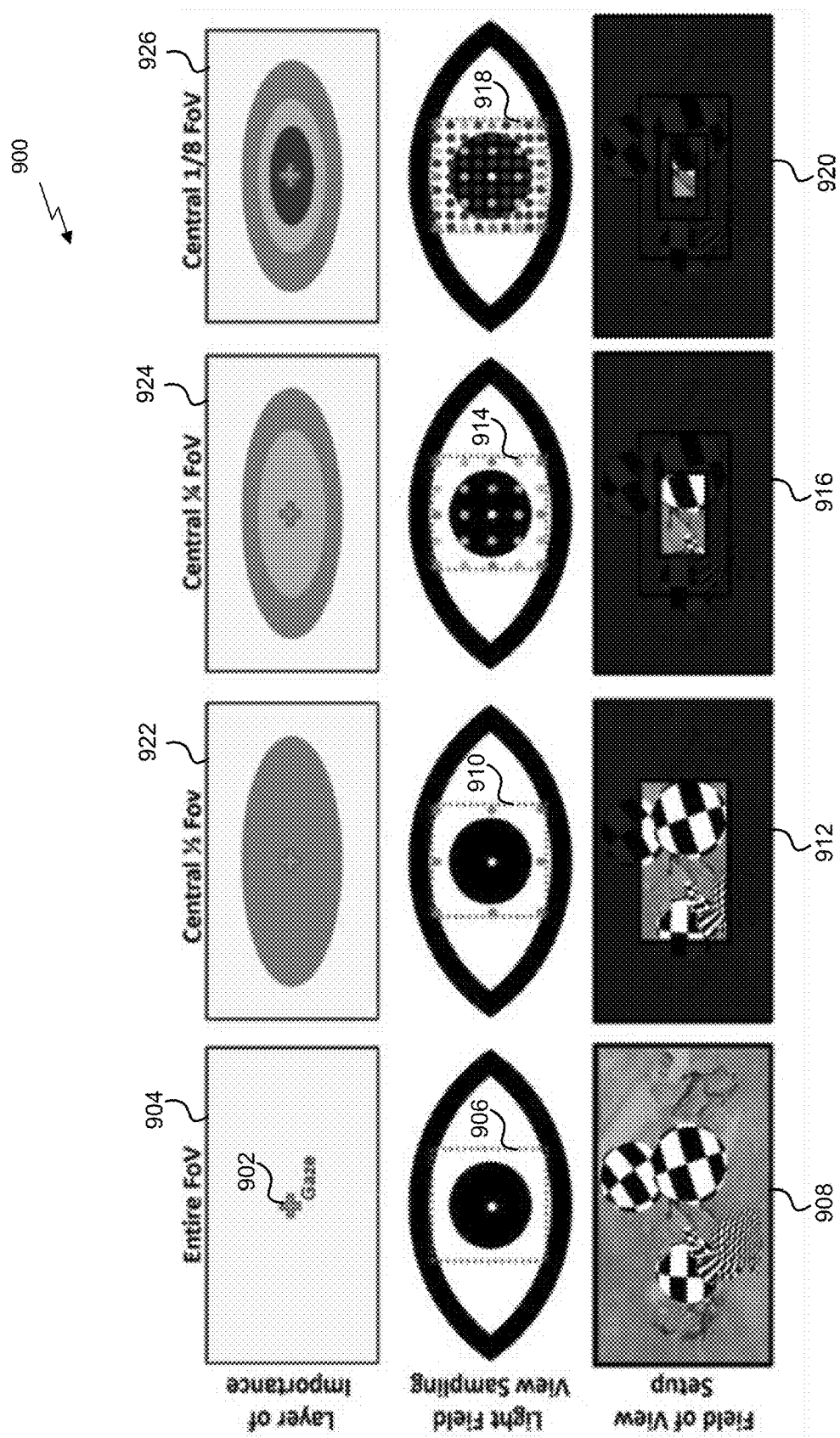
FIG. 9 illustrates an exemplary foveated light field view sampling implementation, in accordance with one embodiment.

FIG. 9 illustrates an exemplary foveated light field view sampling implementation 900. As shown, a gaze point 902 is determined to be located at a center of the image 904. During a first rendering pass, one central view 906 is sampled for all pixels in the scene 908. For example, the first rendering pass may match a traditional 2D rendering pass.

For the viewport regions closer to the gaze point 902, more views may be sampled in order to enable a light field experience. For example, during a second pass, an additional number of views 910 (e.g., 8 more views, etc.) may be sampled with a viewport 912 for a field of view 922 that is smaller than the previous rendering pass (e.g., half of the image 904, etc.), in order to save shading cost.

During a third pass, an additional number of views 914 (e.g., 16 more views, etc.) may be sampled with a viewport 916 for a field of view 924 that is smaller than the previous rendering pass (e.g., ¼ of the image 904, etc.). During a fourth pass, an additional number of views 918 (e.g., 56 more views, etc.) may be sampled with a viewport 920 for a field of view 926 that is smaller than the previous rendering pass (e.g., ⅛ of the image 904, etc.). The process of adding more views across successively smaller viewports and fields of view may continue until a predefined angular sampling rate is reached.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
    determining, by a hardware processor, a location of a gaze point within a scene;
    adjusting, by the hardware processor during a rendering of the scene, an angular sampling rate to produce an adjusted angular sampling rate, based on the location of the gaze point within the scene, wherein the adjusted angular sampling rate indicates a number of different views to render for each pixel of one or more pixels in at least a portion of the scene; and
    rendering the at least a portion of the scene at the adjusted angular sampling rate by selecting, based on the number of different views indicated by the adjusted angular sampling rate, a subset of a plurality of different views at which each pixel of one or more pixels in the at least a portion of the scene is rendered.

2. The method of claim 1, wherein the location of the gaze point includes a current gaze point within the scene.

3. The method of claim 2, wherein the adjusting includes determining an eccentricity from the current gaze point for a predetermined area within the scene.

4. The method of claim 3, wherein the angular sampling rate is adjusted for the predetermined area, based on the eccentricity.

5. The method of claim 3, wherein the adjusting includes increasing the angular sampling rate in response to a decrease in the eccentricity.

6. The method of claim 3, wherein the adjusting includes decreasing the angular sampling rate in response to an increase in the eccentricity.

7. The method of claim 1, wherein the adjusting includes comparing, for a first location within the scene, a spatial sampling rate used to render the first location to a spatial sampling rate of a retina for the first location.

8. The method of claim 1, further comprising adjusting a spatial sampling rate used to render the scene, based on the location of the gaze point.

9. The method of claim 8, wherein the spatial sampling rate of a retina is calculated using a receptive field density of retinal cells.

10. The method of claim 8, further comprising, in response to determining that the spatial sampling rate used to render the scene is larger than a spatial sampling rate of the retina for the scene:
    reducing the spatial sampling rate used to render the scene at the first location;
    and reducing the angular sampling rate used to render the scene at the first location.

11. The method of claim 1, wherein the different views represent different virtual camera locations within an eyebox.

12. The method of claim 11, wherein the different views are included in a predefined grid of a plurality of baseline points.

13. A system comprising: a hardware processor that is configured to:
    determine a location of a gaze point within a scene;
    adjust, during a rendering of the scene, an angular sampling rate to produce an adjusted angular sampling rate, based on the location of the gaze point within the scene, wherein the adjusted angular sampling rate indicates a number of different views to render for each pixel of one or more pixels in at least a portion of the scene; and
    rendering the at least a portion of the scene at the adjusted angular sampling rate by selecting, based on the number of different views indicated by the adjusted angular sampling rate, a subset of a plurality of the different views at which each pixel of one or more pixels in the at least a portion of the scene is rendered.

14. The system of claim 13, wherein the location of the gaze point is used to identify a current gaze point within the scene.

15. The system of claim 14, wherein the adjusting includes determining an eccentricity from the current gaze point for a predetermined area within the scene.

16. The system of claim 15, wherein the angular sampling rate is adjusted for the predetermined area, based on the eccentricity.

17. The system of claim 15, wherein the adjusting includes increasing the angular sampling rate in response to a decrease in the eccentricity.

18. The system of claim 15, wherein the adjusting includes decreasing the angular sampling rate in response to an increase in the eccentricity.

19. The system of claim 13, further comprising adjusting a spatial sampling rate used to render the scene, based on the location of the gaze point.

20. The system of claim 13, wherein the adjusting includes comparing, for a first location within the scene, a spatial sampling rate used to render the first location to a spatial sampling rate of a retina for the first location.

21. The system of claim 20, wherein the spatial sampling rate of a retina is calculated using a receptive field density of retinal cells.

22. The system of claim 13, wherein the different views represent different virtual camera locations within an eyebox.

23. A non-transitory computer-readable storage medium storing instructions that, when executed by a processor, causes the processor to perform steps comprising:
    determining a location of a gaze point within a scene;
    adjusting, during a rendering of the scene, an angular sampling rate to produce an adjusted angular sampling rate, based on the location of the gaze point within the scene, wherein the adjusted angular sampling rate indicates a number of different views to render for each pixel of one or more pixels in at least a portion of the scene; and rendering the at least a portion of the scene at the adjusted angular sampling rate by selecting, based on the number of different views indicated by the adjusted angular sampling rate, a subset of a plurality of the different views at which each pixel of one or more pixels in the at least a portion of the scene is rendered.

* * * * *